United States Patent [19]

Pallini, Jr. et al.

[11] Patent Number: 4,757,593
[45] Date of Patent: Jul. 19, 1988

[54] METHOD OF LOCKING A CONNECTOR

[75] Inventors: Joseph W. Pallini, Jr.; Lionel J. Milberger, both of Houston, Tex.

[73] Assignee: Vetco Gray Inc, Houston, Tex.

[21] Appl. No.: 32,139

[22] Filed: Mar. 27, 1987

Related U.S. Application Data

[62] Division of Ser. No. 841,655, Mar. 20, 1986, Pat. No. 4,711,471.

[51] Int. Cl.$^4$ .............................................. B23P 11/00
[52] U.S. Cl. ...................................... 29/432; 29/516; 285/92
[58] Field of Search ................ 29/505, 509, 515, 432, 29/516; 285/92; 403/343; 411/221, 291

[56] References Cited

U.S. PATENT DOCUMENTS

| | | | |
|---|---|---|---|
| 1,987,176 | 1/1935 | Biggert | 29/509 |
| 4,668,119 | 5/1987 | Galletti | 403/343 |

FOREIGN PATENT DOCUMENTS

| | | | |
|---|---|---|---|
| 1207657 | 7/1986 | Canada | |
| 99293 | 1/1984 | European Pat. Off. | 285/92 |

Primary Examiner—P. W. Echols
Assistant Examiner—Andrew E. Rawlins
Attorney, Agent, or Firm—Joseph R. Dwyer

[57] ABSTRACT

A method for a cutting locking tab 56 and tool for a selected configuration on a joint (a pin (12a) and box (16a) threaded together). The pin has longitudinal slot(s) 24a and the box (16a) has inner and outer peripheral grooves (44,46) forming shear lines (50) to enhance the shearing to form the locking tab (56).

The essential feature is the elimination of clocking, i.e., a predetermination of the relative orientation of the box and pin during manufacture.

7 Claims, 3 Drawing Sheets

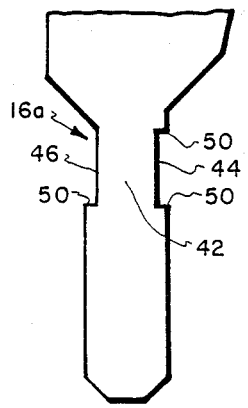
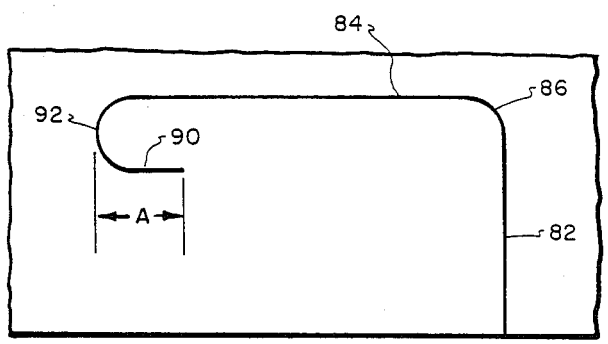
Fig. 10.   Fig. 11.
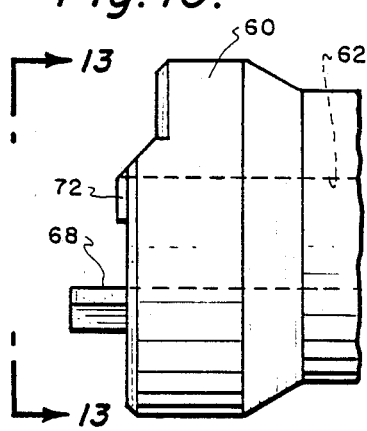
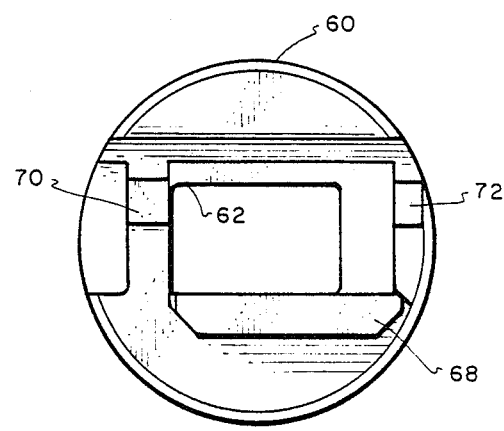
Fig. 12.   Fig. 13.
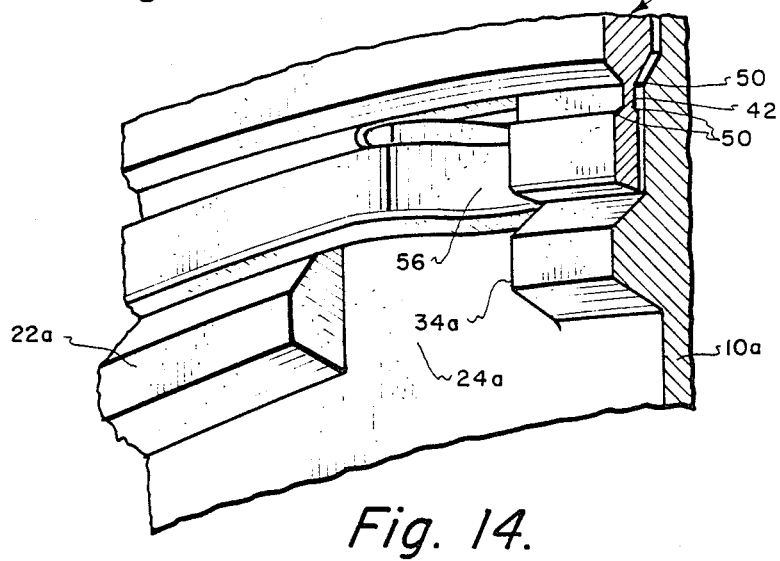
Fig. 14.

METHOD OF LOCKING A CONNECTOR

This application is a division, of application Ser. No. 841,655, filed 3/20/86, now U.S. Pat. No. 4,711,471 issued Dec. 8, 1987.

BACKGROUND OF THE INVENTION

This invention relates to connectors for large diameter tubular members and is particularly directed to a method and for locking the connectors in their fully made-up (fully joined) condition.

Large diameter pipes (16 to 36 inch OD or the like) are used in lengths about 40 feet long for casing and risers in offshore drilling and production operations. To connect these lengths of pipe as a string of pipes, easily made-up, leak-tight connectors that will not become disconnected are desirable.

PRIOR ART

Conventionally there is a threaded box at one end and a threaded pin at the other end of each pipe length to make up a string of casing or risers and to prevent disconnection, i.e., unthreading, at the joints, several approaches are used; one such anti-rotation locking mechanism is illustrated by way of example in FIG. 1 of the drawings. There is shown a large diameter pipe 10 with a weld-on pin or male member 12 with frustoconical threads 14 threadable into a box or female member 16 having internal mating frustoconical threads (not shown). The box 16 is also connected to a pipe 20 by welding. As shown in this figure, the pin 12 has a rib 22 at the base of the threads 14 and a plurality of longitudinal pin slots 24 formed in the rib and part of wall of the body of the pin (only one being shown and described) which cooperate with a peripherally oriented through-slot 26 on the lower (outboard) edge of the box 16. When the joint is fully made up, the through-slot 26 on the box 16 will align with the pin slot 24. The box may be marked as at 30 to facilitate this alignment. Then the area 32 of the box below the through-slot 26 (i.e., the outboard side of the box), adjacent edge 34 of the pin slot 24, is sheared, forming a tab which engages slot edge 34, thereby locking the connector and preventing unthreading. The slot edge 34 acted as cutting edge as the end of the tab was formed.

One of the problems with the prior art anti-rotating locking mechanism is that the final position of the through-slots 26 on the box 16, relative to the pin slots 24, when made-up, had to be determined at the time of manufacture. This meant that each pin and box had to be gaged so that the position of the box relative to the pin could be determined with a threaded gage. Once determined, the gage had to be disconnected and the through-slots 26 were machined in the box 16. This procedure, known as clocking, was expensive, time-consuming, and increased the cost of the manufacture of these connectors. Too, since so much depended upon the accuracy of alignment of these slots, any error could have costly, time-consuming effect in field operations. In addition, the variation in the length of the tabs due to clocking tolerances creates some variation in the torque resistance of the tabs.

It is therefore an object of this invention to provide a new and improved method of locking connectors together which requires no clocking, thereby reducing manufacturing cost, improving rejection rates, and reducing time and alleviating any potential misalignment problems that may occur in the field, as well as provide a more consistent tab. It is also desirable to maintain the radius of the ends of the tab to avoid high stress concentrations.

SUMMARY OF THE INVENTION

The invention which accomplishes the foregoing object comprises providing longitudinal slot(s) in the pin of a connector and forming peripheral groove(s), both inside and out on the walls of the box of the connector, such that when the joint is made up (pin and box threaded together), a cutting tool, juxtapositioned the pin slot and the outside groove, will shear an area of the wall of the box in a particular configuration forming locking tabs, thereby locking the connector against disconnection.

Also disclosed is a cutting tool with a shear face for shearing the box edge in a selected manner to provide the anti-rotation locking means.

BRIEF DESCRIPTION OF THE DRAWINGS

FIG. 10 is a schematic illustration of a cross-section of the inner and outer walls of the box, FIG. 11 is a schematic illustration of the cut made by the cutting tool on the outer wall of the box, FIG. 12 is a side view of the housing for the cutting tool, FIG. 13 is a frontal view of the housing for this cutting tool, FIG. 14 is a perspective view of the completed, finally anti-rotational locking means.

DETAILED DESCRIPTION

As mentioned above, FIG. 1 represents the prior art anti-rotation locking mechanism for locking a threaded connector to prevent decoupling (unthreading).

Figure 1:
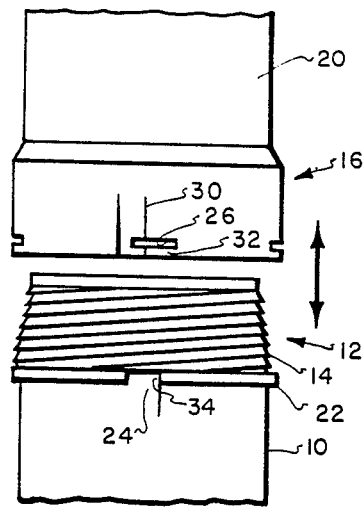
FIG. 1 illustrates the prior art anti-rotation locking means on a typical pin and box connector as mentioned in the Background, above.
Figure 2:
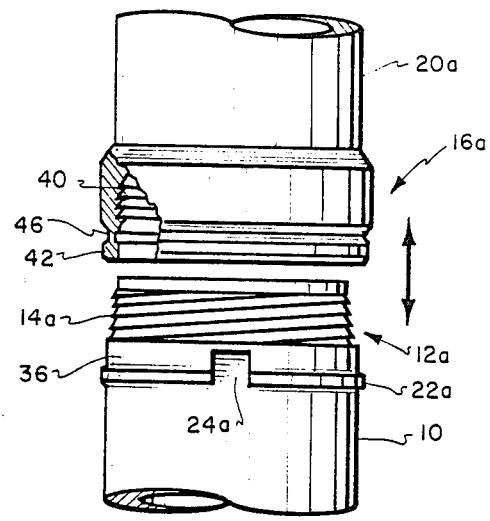
FIG. 2 illustrates a pin and box connector with the box modified in accordance with the teachings of this invention.

FIG. 2 illustrates a connector similar to that shown in the prior art of FIG. 1 but modified in accordance with the teachings of this invention to provide an anti-rotation lock means which does not require clocking. In the further description herein, where possible, the components described in FIG. 1 and having the same function in the remaining figures, will be given the same reference numeral except with a suffix "a".

As shown, a pin 12a is welded onto a pipe 10a and is provided with frustoconical threads 14a with a rib >a located near the base of the threads. In this embodiment, however, the rib 22a spaced slightly below the base of the threads 14a, i.e., separated by a guide surface 36. The rim 22a of the pin 12a is provided with a pin slot 24a formed by any suitable means, as by milling, in a longitudinal direction. In this figure, only one such pin slot is shown but any number may be selected. Conventionally, an even number from two to eight of such pin slots are provided.

The box 16a is welded onto a pipe 20a and is the frustoconical threads 14a of the pin 12a. The threads 40 are numbered as such only because they were not shown in FIG. 1, although the same type of threads 14a and 40 may be the same as in the prior art.

As shown in this figure and more clearly in FIG. 10, the lower or outboard portion 42 of the box 16a is thinner and the box is formed with an internal groove 44 at its inner wall and an external groove 46 on its outer wall. Each groove is formed circumferentially of the box 16a and is defined by sharp edges 50 forming upper and lower peripheral shear lines and 90° shear planes for the cutting tool to be described.

Figure 3:
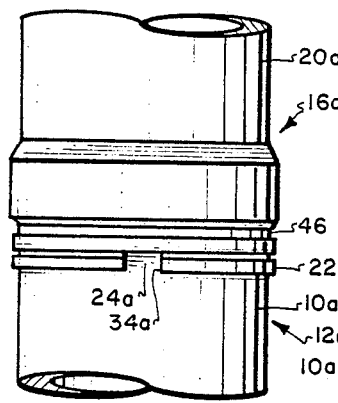
FIG. 3 illustrates a fully made-up connector prior to shearing the box to complete the anti-rotation locking means.
Figure 4:
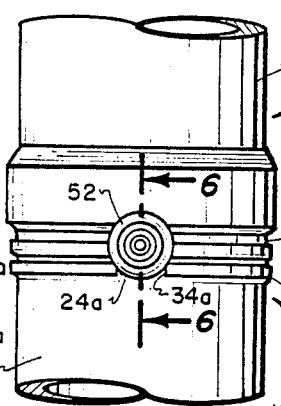
FIG. 4 illustrates the impact tool being positioned adjacent the joint to shear the edge of the box and complete the anti-rotation locking means.
Figure 5:
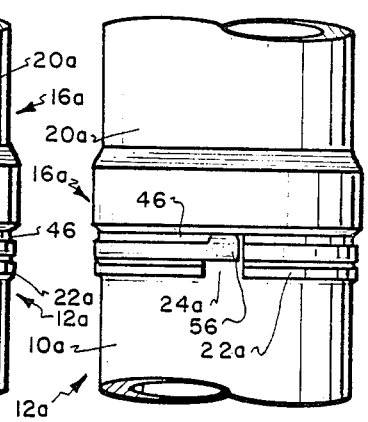
FIG. 5 illustrates the box having been sheared and locked against rotation relative to the pin in the decoupling direction.

FIGS. 3, 4, and 5, respectively, show the connector completely made up with the internal and external grooves 44 and 46 overlapping the major portion of the pin slot 24a; FIG. 4 illustrating the positioning of impact tool 52; and FIG. 5 showing the formation of tab 56 forming anti-rotation locking means of this invention. This tab 56 engages an edge 34a in the pin slot 24a and is more clearly shown in FIG. 14. This tab 56 is of a particular configuration and how it is formed and the tool used to form it will now be described.

Figure 6:
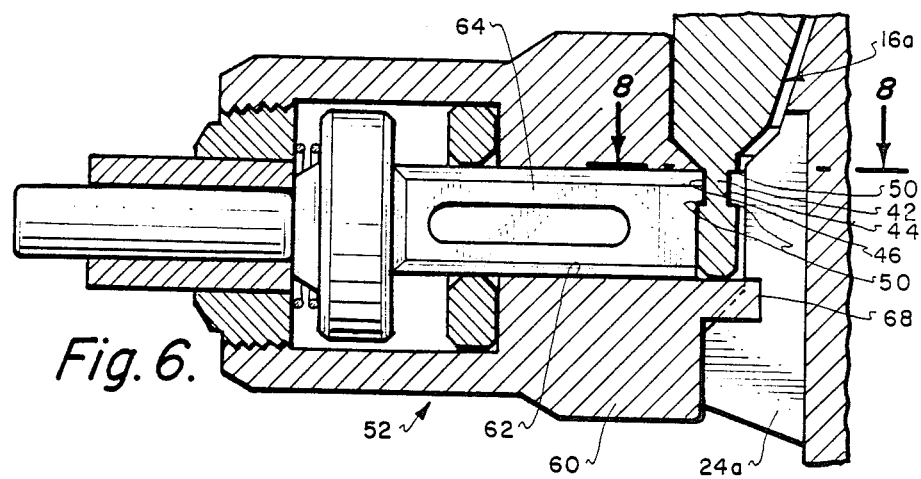
FIG. 6 is an enlarged view of that shown in FIG. 4, taken along line 6—6 of FIG. 4 and showing the impact tool positioned in the pin slot and against the outer edge of the box before shearing.

Thus, as shown in FIG. 6, the cutting tool 52 comprises a housing 60 having an internal chamber 62 for a hammer 64 which is slidable therein. This hammer 64 is moved axially of the housing 60 in any suitable manner, preferably by an air or hydraulic power source, and this movement is represented by an arrow 66 in FIG. 7. The details of the connection of the power source to the hammer form no part of this invention and will not be described further.

Figure 7:
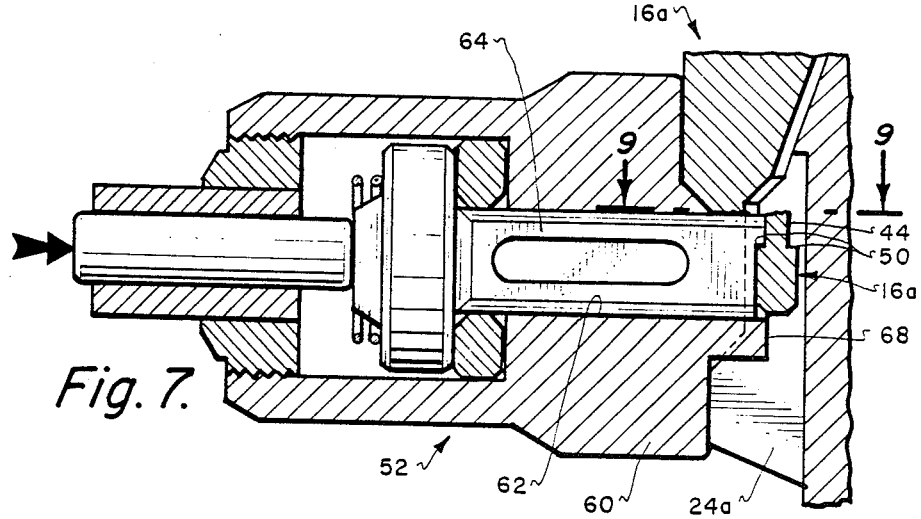
FIG. 7 is similar to FIG. 6 except showing that the impact tool housing sheared a part of the box radially inwardly into the pin slot to form the anti-rotation locking means.

To align the cutting tool 52 with the box 16a, the housing 60, and as more clearly shown in FIGS. 6, 7, 12 and 13, has a circumferential alignment blade 68 wide enough to span the width of the slot 24a. This serves to orient the housing 60 horizontally. The housing 60 is also provided with a pair of axial alignment probes 70 and 72 which engage the outer groove on the box. This orients the tool 52 vertically and when the cutting tool is placed as shown in FIGS. 6 and 7, the tab 56 is formed by activation of the hammer moving and shearing the selected portion of the box into the pin slot in a special manner.

Figure 8:
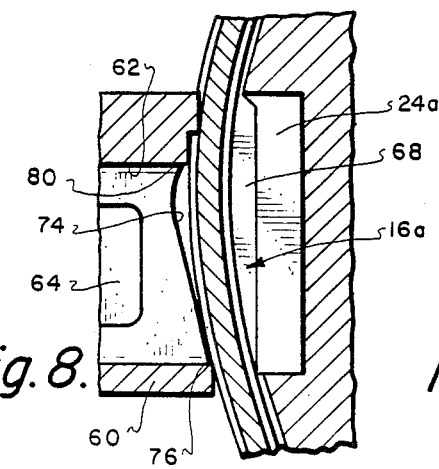
FIG. 8 is another view of the impact tool against the outer surface of the box before shearing, taken along 8—8 of FIG. 6.
Figure 9:
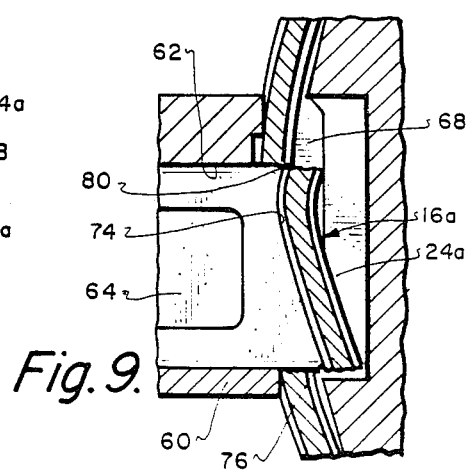
FIG. 9 illustrates the impact tool having bent and sheared the outer periphery of the box into the pin slot.

FIGS. 8, 9 and 11, taken together, show the hammer 64 is provided with a front face 74 which, in the horizontal view, has a first cutting edge 76, which upon energization of the hammer 64, will shear the box 16a along the upper shear line and move the sheared material into the groove 24a, while the opposite or second cutting edge 80 will shear the box 16a and only partially bend the material of the box into the groove 24a. The first cutting edge 76 moves the sheared material a greater distance into the groove 24a with a progressively less bend being made as the shear meets the edge 80.

The special configuration of the cutting tool front face is more clearly shown on the outer side wall of the box in the illustration of FIGS. 11 and 14.

FIG. 11 illustrates a right edge 82, sheared by the first edge 76, a horizontal line 84 joined by a curved corner 86 sheared by the horizontal edge of the front face 74 along the upper shear line terminating in a reverse section 90 joined by a semi-circular cut 92 sheared by the second edge 80 along the lower shear line. The radius of the corner 86 and semicircular cut 92 prevents high stress concentration that might induce cracking and the length of the reverse section 90 determines or controls bending of the tab as shown by arrow A and more clearly shown in FIG. 14.

We claim:

1. A method of locking a connector together, said connector comprising a box and a pin,
   forming threads on said box and said pin such that, when the box and pin are threaded together, the box overlaps the pin,
   forming a thin wall on said box parallel to the open end of the box before making up said connector, forming an internal and an external peripheral groove on the thin wall of the box below the threads to thin the wall of the box,
   forming at least one pin slot on said pin,
   making up said connector by interengaging said threads without reguard to the location of said pin slot,
   radially shearing the thin wall of the box, after interengaging said threads, at a location adjacent said pin slot in a predetermined pattern whereby said pattern of shear forms a shear portion which extends a selected length of said thin wall and terminates at one end in a shear which is transverse to said thin wall and terminates at the other end in a curved shear and a shorter parallel shear and urging the sheared portion into the said pin slot.

2. The method as claimed in claim 1 wherein the step of shearing of the thin wall is such that the depth of shear varies progressively from one end of the sheared portion to the other.

3. The method as claimed in claim 2 wherein the shape of the sheared portion determines the bending characteristic of the sheared portion.

4. A method of forming a joint between a box which has internal threads and a pin which has external threads adapted to be threaded together to form said joint, the improvement comprising,
   providing an external peripheral groove on the outside of the box below the threads which outside is otherwise uniform and uninterrupted until a locking tab is formed thereon,
   providing an internal groove on the inside of the box below the threads in the area of the external groove thereby thinning the wall of the box and forming peripheral shear lines,
   providing the pin with at least one longitudinal slot thereon such that when the joint is made up by threading the internal and external threads, the thin wall of the box overlaps the longitudinal slot on the pin,
   forming said joint by interengaging said threads,
   forming a locking tab on the box after said joint is formed by shearing the thin wall peripherally at said peripheral shear line and bending the locking tab radially inwardly whereby the locking tab engages the longitudinal slot to lock the pin and box together against relative rotation.

5. The method as claimed in claim 4 wherein said locking tab is formed by providing a first vertical shear line, providing a first horizontal shear line connected to the first vertical shear line, providing a second horizontal shear line spaced from the first horizontal shear line and providing a third shear line connected to the first and second shear lines.

6. The method as claimed in claim 5 including the further step of bending the shear pattern progressively from the third shear line to the first vertical shear line.

7. The method as claimed in claim 6 further including the step of varying the depth of the bend of the locking tab progressively more from the third shear line to the first vertical shear line.

* * * * *